(12) United States Patent
Li et al.

(10) Patent No.: US 6,411,610 B1
(45) Date of Patent: Jun. 25, 2002

(54) CORRELATION FOR SYNCHRONIZING TO LONG NUMBER SEQUENCES IN COMMUNICATIONS SYSTEMS

(75) Inventors: Bin Li; Wen Tong, both of Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/186,484

(22) Filed: Nov. 5, 1998

(51) Int. Cl.[7] .............................................. H04B 7/216
(52) U.S. Cl. ........................ 370/335; 370/342; 375/150
(58) Field of Search ................................ 370/320, 335, 370/342, 441, 479; 375/142, 143, 152, 153, 343, 347, 147, 150; 708/316, 422, 426

(56) References Cited

U.S. PATENT DOCUMENTS

| | | | | | |
|---|---|---|---|---|---|
| 5,463,660 A | * | 10/1995 | Fukasawa et al. | ........... | 375/205 |
| 5,563,907 A | * | 10/1996 | Lomp | ........... | 375/142 |
| 5,719,900 A | * | 2/1998 | Dixon et al. | ........... | 375/208 |
| 5,764,690 A | * | 6/1998 | Blanchard et al. | ........... | 370/210 |
| 5,881,056 A | * | 3/1999 | Huang et al. | ........... | 370/335 |
| 5,933,763 A | * | 8/1999 | Wang et al. | ........... | 340/7.22 |
| 6,067,313 A | * | 5/2000 | Cafarella et al. | ........... | 375/130 |
| 6,188,679 B1 | * | 2/2001 | Sato | ........... | 370/335 |
| 6,192,042 B1 | * | 2/2001 | Seo | ........... | 370/342 |
| 6,212,223 B1 | * | 4/2001 | Okamoto | ........... | 375/150 |

* cited by examiner

Primary Examiner—Ajit Patel
Assistant Examiner—Ahmed Elallam

(57) ABSTRACT

A correlation arrangement comprises $2^k$ correlators each for correlating a sub-block of k symbols of a sequence derived from a received signal of a wireless communications system with all $2^k$ possible sequences of k binary symbols to produce a respective one of $2^k$ correlator outputs. For PN (pseudo random noise) synchronization, for each of N candidate PN sequences, a sub-block of k binary symbols of the respective candidate PN sequence is used to select a respective one of the $2^k$ correlator outputs as a correlation output for the sub-block, and the selected sub-block correlation outputs are accumulated for m sub-blocks to produce a correlation result for a correlation block of mk symbols. A maximum one of the N correlation results is detected and the candidate PN sequence providing this maximum is identified for PN synchronization. N, k, and m are integers. The arrangement reduces computation for large values of N and large correlation blocks.

20 Claims, 2 Drawing Sheets

CORRELATION FOR SYNCHRONIZING TO LONG NUMBER SEQUENCES IN COMMUNICATIONS SYSTEMS

This invention relates to correlation, especially for synchronizing to long number sequences in communications systems such as spread spectrum cellular systems or other wireless digital communications systems. The long number sequences are typically pseudo random noise sequences, generally referred to as PN sequences.

BACKGROUND OF THE INVENTION

In spread spectrum communications systems, such as CDMA (code division multiple access) wireless communications systems, fast synchronization to a PN sequence is of increasing importance. It is known to use correlation techniques for PN sequence synchronization, this also being referred to as PN acquisition. Typically, a receiver of the communications system receives a communicated signal incorporating a PN sequence and correlates this with locally generated versions of the PN sequence using different time shifts, determining a maximum correlation result and hence a corresponding time shift for PN synchronization purposes. However, for long PN sequences the computation required for the correlation becomes so extensive that it becomes difficult to implement using either DSP (digital signal processing) techniques or dedicated hardware devices.

For example, the PN sequence may be a maximal length or m-sequence which is generated by a linear feedback shift register and whose length is $2^r-1$ symbols where r is the number of stages of the shift register. In wireless CDMA communications systems such as those commonly referred to by the designations IS-95 and CDMA2000, for example r=42, so that the length of the PN sequence is very large, and a large number of correlations with candidate PN sequence timings must be carried out. It is desired in such systems to complete the PN sequence synchronization within one frame of 20 ms duration, so that the computations for such correlations must be performed very quickly. This onerous computation requirement presents an increased problem for the case of packet data communications using such communications systems, for which the PN sequence synchronization must be performed for every packet.

Accordingly, an object of this invention is to provide an improved correlation method for facilitating fast synchronization to a long PN sequence.

SUMMARY OF THE INVENTION

One aspect of this invention provides a method of correlating a first symbol sequence with a relatively large number of second symbol sequences to produce respective correlation results for a correlation block of symbols, comprising the steps of: for each of a plurality of sub-blocks of the correlation block, producing respective sub-block correlation results; and accumulating the respective sub-block correlation results to produce the respective correlation results for the correlation block; wherein the step of producing respective sub-block correlation results comprises, for each sub-block, the steps of: correlating the sub-block of the first symbol sequence with all possible sequences for the sub-block of the second symbol sequences to produce a plurality of possible correlation results for the sub-block; and for each of the second symbol sequences, selecting a respective one of the possible correlation results for the sub-block, to constitute the sub-block correlation result for the respective second symbol sequence, in dependence upon the sub-block of the respective second symbol sequence.

If the correlation block length is L symbols and each of the sub-blocks comprises k symbols, where L=mk and L, k, and m are integers greater or equal to one, preferably each of the second symbol sequences is a binary symbol sequence and the step of correlating each sub-block of the first symbol sequence with all possible sequences for the sub-block of the second symbol sequences produces $2^k$ possible correlation results for the sub-block.

Each of the second symbol sequences can be provided from a pseudo random noise sequence, and the first symbol sequence can be derived from a received signal of a wireless communications system. The method can further comprise the step of detecting a maximum of the correlation results for the correlation block thereby to identify one of said second symbol sequences providing the maximum correlation result.

Another aspect of this invention provides a correlation arrangement comprising: $2^k$ correlators each for correlating k symbols of a first symbol sequence with a respective one of $2^k$ different sequences each of k binary symbols to produce a respective one of $2^k$ correlator outputs; N selectors each responsive to k symbols of a respective one of N binary symbol sequences to select a respective one of said $2^k$ correlator outputs; and N accumulators each for accumulating the selected correlator outputs of a respective one of the N selectors for a plurality of m successive selected correlator outputs to produce a respective one of N correlation results for a correlation block of mk symbols; where k, N, and m are integers greater or equal to one.

The correlation arrangement can further comprise a detector responsive to the N correlation results to identify one of the N binary symbol sequences providing a maximum correlation result.

The invention also extends to a wireless communications system receiver including a correlation arrangement as recited above, wherein the first symbol sequence is derived from a received signal of the system.

BRIEF DESCRIPTION OF THE DRAWINGS

The invention will be further understood from the following description with reference to the accompanying drawings, in which.

DETAILED DESCRIPTION

Figure 1:
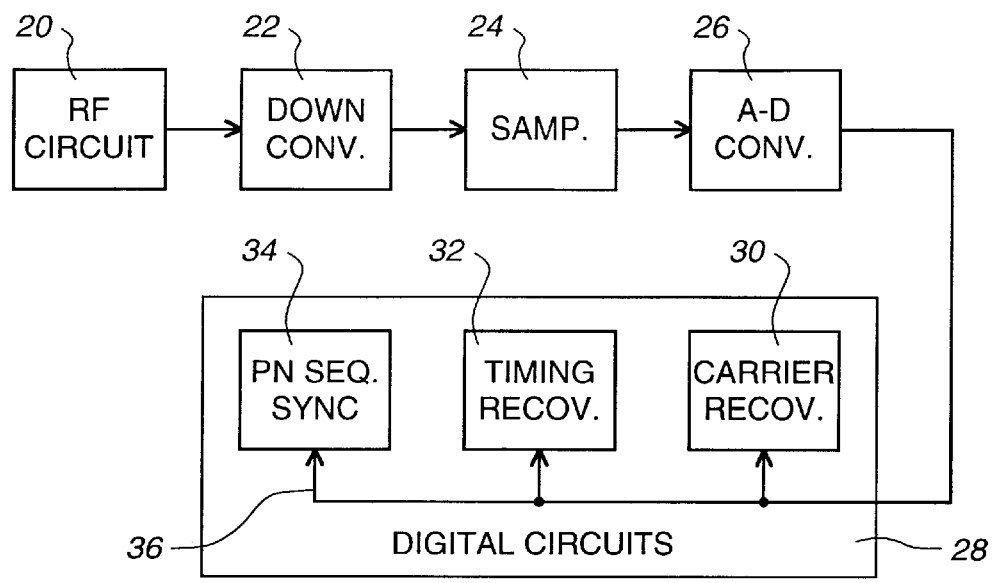
FIG. 1 schematically illustrates a block diagram of parts of a receiver of a known CDMA wireless communications system.

Referring to the drawings, FIG. 1 illustrates in a block diagram, by way of example of an environment in which the invention can be applied, parts of a receiver of a CDMA wireless communications system in which a received signal is supplied via an RF (radio frequency) circuit 20 to a down converter 22 to produce a signal which is sampled by a sampler 24, the samples being converted into digital form by an A-D (analog-to-digital) converter 26 for processing in digital circuits 28, for example implemented in a DSP integrated circuit or an ASIC (application specific integrated circuit). The digital circuits 28 include a carrier recovery block 30, a timing or clock recovery block 32, and a PN sequence synchronization block 34 in which processing of the digital signals is performed. The PN sequence synchronization block 34 is supplied with the sampled and digitized received symbol sequence from the output of the A-D converter 26 via a line 36.

Figure 2:
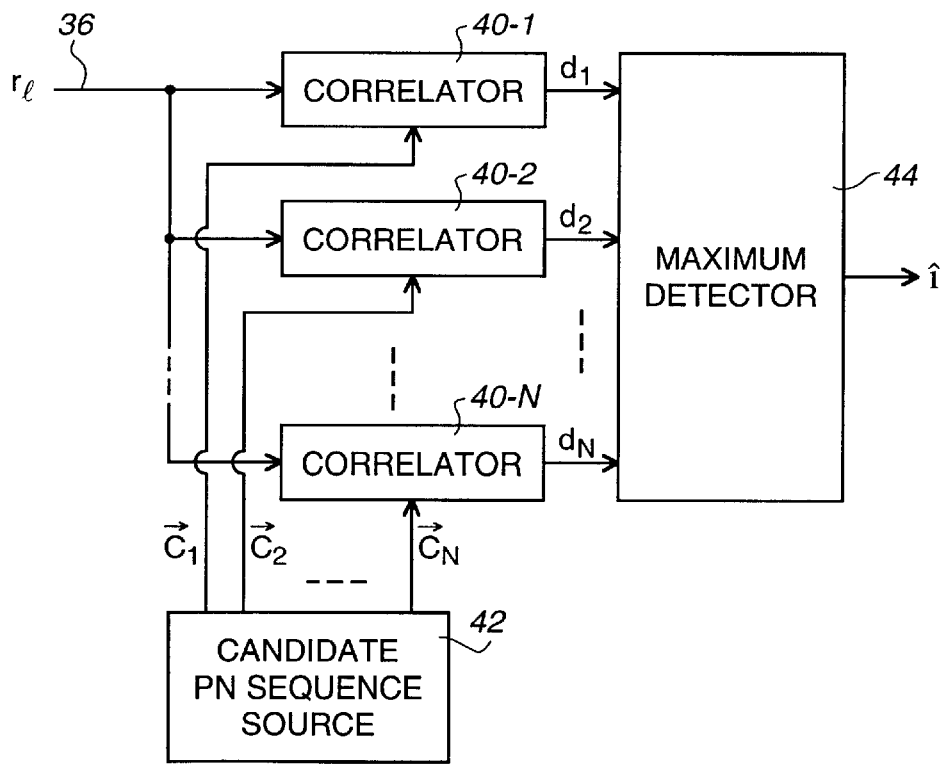
FIG. 2 represents a known correlation arrangement for PN synchronization in the receiver of FIG. 1.

FIG. 2 represents a known correlation arrangement for PN sequence synchronization, or acquisition, in the receiver of FIG. 1. This arrangement is represented as comprising a multiplicity N of correlators 40-1 to 40-N, only three of which are shown with the presence of the remainder being indicated by dashed lines. Each correlator is supplied with soft decision samples $r_l$ of a received signal on the line 36, and with a respective one of N candidate PN sequences $\vec{C}_i$, where i is an integer from 1 to N, from a candidate PN sequence source 42. Each correlator produces a respective correlation output $d_i$ which it supplies to a maximum detector 44, an output $\hat{i}$ of which is the index of the candidate PN sequence providing the greatest correlation output $d_i$. Although the correlators are shown as being in parallel with one another, it can be appreciated that the N correlations can be carried out by any number of correlators performing the N correlations in parallel and/or sequentially in time within the time constraints imposed by the communications system.

The N candidate PN sequences supplied from the source 42, which are also referred to as uncertain PN sequences, are generally time shifted from one another, and their number N depends on factors such as transmission delay of the system and a random delay of, for an IS-95 system, up to 512 Walsh chips or symbols. Assuming that the transmission channel is an AWGN (additive white Gaussian noise) channel, and that for PN synchronization the received signal is an unmodulated binary PN sequence with values of plus or minus one, then the correlations and their outputs $d_i$ are given by the equation:

$$d_i = \sum_{l=1}^{L} C_{i,l} r_l$$

where as indicated above $r_l$ is the received signal sample, $C_{i,l}$ is the l-th chip of the transmitted i-th PN sequence with a value of plus or minus one, and L is the correlation length, i.e. the number of symbols over which the correlation is performed.

It can be appreciated from the above equation that each correlation requires L−1 additions and L multiplications, so that the N correlations require a total of N(L−1) additions and NL multiplications. Thus when L and N are large, the computation requirements become very considerable, even though the multiplications are only sign manipulations because of the binary (±1) nature of the candidate PN sequence values. For example, for an IS-95 system typically L=256*8 and N=800, so that the total number of additions and multiplications required for the correlations exceeds 1.6 million.

The present invention makes use of a recognition that, if L in the above correlations can be made relatively small, for example having a small value k, then the number $K=2^k$ of possible binary PN sequences is much less than the number N of candidate PN sequences. For example, if k=4 then K=16, which is much less than N=800. In other words, with a small value of k many of the N=800 correlations are identical and there are only K (=16 for k=4) possible correlation outputs. These can be provided by kK (64 for k=4) multiplications and (k−1)K (48 for k=4) additions. A selection of one of the K correlation outputs can then be made for each of the N candidate PN sequences, the selected output depending upon the particular candidate PN sequence. This results in much less computation than is required for the correlations as described above with reference to FIG. 2.

In order to make use of this recognition for typical situations in which L is large, large signal blocks each of L chips or symbols are subdivided into multiple sub-blocks, and the correlation results for these sub-blocks are determined as outlined above and are accumulated for each candidate PN sequence over the large signal blocks to produce the respective correlation result. For example, with L=mk, where m and k are integers, each large signal block of L chips or symbols is divided into m sub-blocks each of k chips or symbols, and for each of the N candidate PN sequences the selection of one of the $K=2^k$ correlation outputs is dependent upon a correspondingly small block of k symbols of the respective candidate PN sequence. The selected correlation outputs are accumulated for each of the N candidate PN sequences over the m sub-blocks to produce a final correlation result for each of the N candidate PN sequences, and a maximum one of these is determined in conventional manner for PN synchronization.

Figure 3:
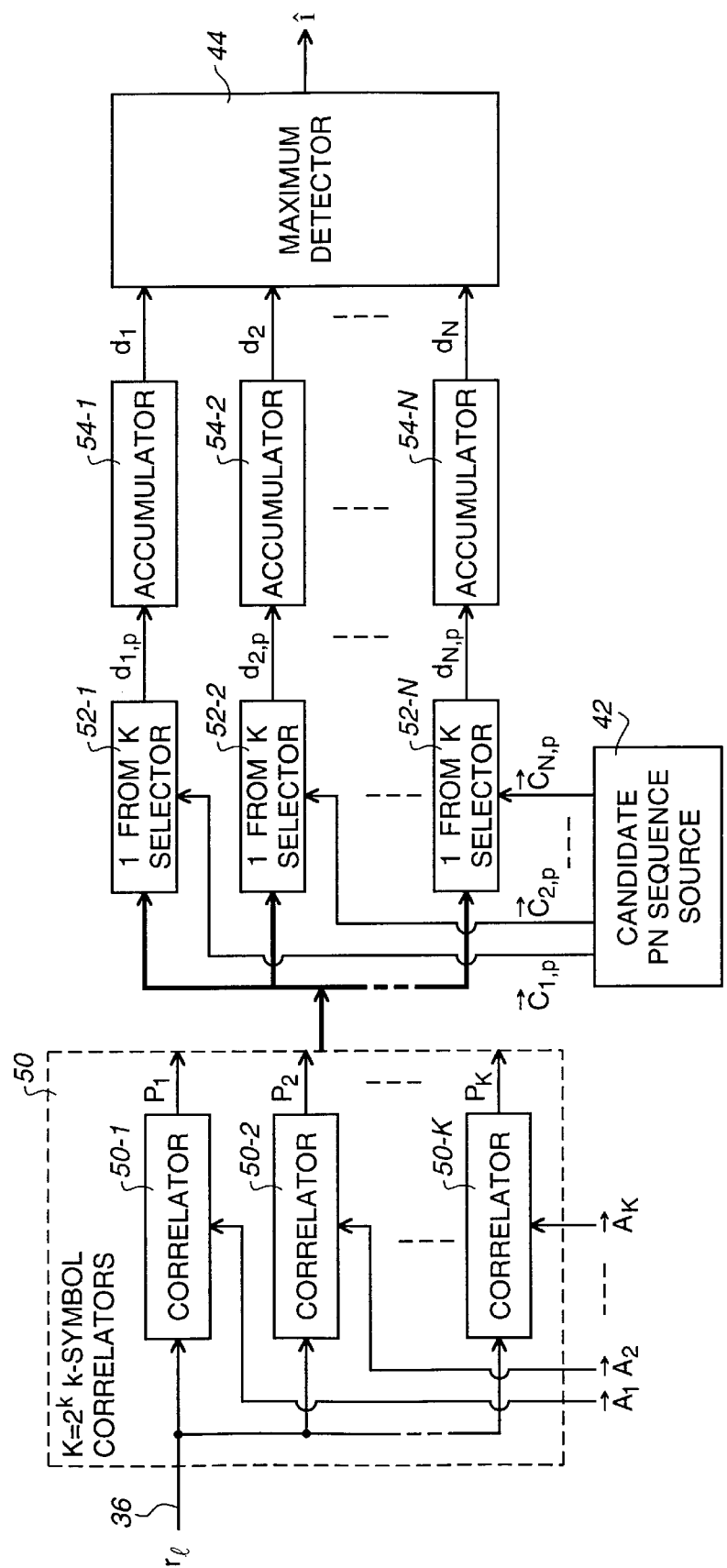
FIG. 3 represents a correlation arrangement for PN synchronization in accordance with an embodiment of this invention.

FIG. 3 schematically illustrates a correlation arrangement for PN synchronization in accordance with this procedure. As in the case of FIG. 2, a parallel arrangement is shown for the correlation of the N candidate PN sequences, but it can be appreciated that the correlations, selections, and accumulations can be carried out in any desired manner of parallel and/or sequential processing.

Referring to FIG. 3, in addition to the candidate PN sequence source 42 and maximum detector 44 that can be the same as in the arrangement of FIG. 2, the arrangement is represented as comprising K=2k correlators 50, shown within a dashed line box and individually referred to as correlators 50-1 to 50-K, N 1-from-K selectors 52-1 to 52-N, and N accumulators 54-1 to 54-N, there being one selector and one accumulator for each of the N candidate PN sequences. For simplicity only three correlators, selectors, and accumulators are represented in FIG. 3, the presence of the remainder being indicated by dashed lines.

Each of the correlators 50 is supplied with the soft decision samples $r_l$ of the received signal on the line 36, and with a respective one of all of the K possible sequences $\vec{A}_j$ of a sub-block of k symbols, where j is an integer from 1 to K. Thus with binary symbols each having a value of plus or minus one, the $K=2^k$ possible sequences $\vec{A}_j$ each of k symbols are:

$\vec{A}_1=(-1,-1,\ldots,-1), \vec{A}_2=(-1,-1,\ldots,1),\ldots,\vec{A}_K=(1,1,\ldots,1)$ The correlators 50 produce all possible correlation outputs $P_1$ to $P_K$ at the K outputs of the correlators 50-1 to 50-K respectively, each correlation output $P_j$ being a correlation of k samples of the received signal on the line 36 with the k symbols of the respective sequence $\vec{A}_j$ in the respective correlator 50-j. Consequently, as described above, the correlators 50 collectively perform a total of kK multiplications and (k−1)K additions for each sub-block of k symbols.

Each of the N selectors 52-1 to 52-N is supplied, as represented by bold lines in FIG. 3, with all K=16 outputs $P_j$ of the correlators 50, and selects as its output $d_{i,p}$ a respective one of these outputs $P_j$ in dependence upon a respective k-symbol sub-block of its associated candidate PN sequence, represented as $\vec{C}_{i,p}$, where i is an integer from 1 to N as described above in relation to FIG. 2. Thus each of the N candidate PN sequences $\vec{C}_i$ is treated as being divided into k-symbol sub-blocks identified by p, which is an integer from 1 to m, and it can be seen that the p-th sub-block of the i-th candidate PN sequence $\vec{C}_i$ is:

$$\vec{C}_{i,p} = (C_{i,(p-1)k+1}, C_{i,(p-1)k+2}, \ldots, C_{i,pk})$$

This corresponds to one of the sequences $\vec{A}_j$, and is used by the respective selector 52-i to select the corresponding correlation output $P_j$ to produce the respective selector output $d_{i,p}$.

Each of the selectors 52-1 to 52-N supplies its output $d_{i,p}$ to a respective one of the accumulators 54-1 to 54-N, which accumulates the outputs $d_{i,p}$ for all of the m sub-blocks of the large block of L symbols to produce the final correlation result $d_i$ for the respective one of the N candidate PN sequences. Thus:

$$d_i = \sum_{p=1}^{m} d_{i,p}$$

which requires m−1 additions for each of the N accumulators 54-1 to 54-N.

As described in relation to FIG. 2, the maximum detector 44 determines the index $\hat{i}$ of the candidate PN sequence providing the greatest correlation output $d_i$.

It can be appreciated from the above description that the correlation arrangement of FIG. 3 has a total computation requirement of $k2^k$ multiplications and $(k-1)2^k$ additions for the correlators 50 for each of the m sub-blocks, and hence a total of $mk2^k = L2^k$ multiplications and $m(k-1)2^k$ additions for the correlators 50 for the correlation length L, plus N(m−1) additions for the accumulators 54-1 to 54-N. In comparison, the arrangement of FIG. 2 requires NL multiplications and N(L−1) additions. For large values of N and L, the ratio of the number of multiplications or additions required by the arrangement of FIG. 3 to those required by the arrangement of FIG. 2 is equal to or about $2^k/N$, which represents a saving by a factor of 7 to 10 for an optimum value of k applied to IS-95 communications systems and CDMA2000 communications systems with bandwidths of 5 or 10 MHz.

Although specific values of k, L, and N have been given in the above description, it can be appreciated that these are provided only by way of example and different values occur in different situations, and in particular that an optimum value of k will depend on particular circumstances.

In addition, although as described above the correlation results are selected from the outputs of the correlators 50, it can be appreciated that they could be stored in a table in memory and accessed using table-lookup techniques. Furthermore, these correlation results can be used for each sub-block as described above, or for groups of sub-blocks or for the entire correlation length block as desired.

Furthermore, although the correlation arrangement as described above is applied to synchronization to a PN sequence for a communications system, it can be appreciated that the invention is also applicable to correlation to any form of number sequence in a communications system or in any other application.

Thus although a particular embodiment of the invention has been described in detail, it should be appreciated that these and numerous other modifications, variations, and adaptations may be made without departing from the scope of the invention as defined in the claims.

What is claimed is:

1. A method of correlating a first symbol sequence with a relatively large number of second symbol sequences to produce respective correlation results for a correlation block of symbols, comprising the steps of:
   for each of a plurality of sub-blocks of the correlation block, producing respective sub-block correlation results; and
   accumulating the respective sub-block correlation results to produce the respective correlation results for the correlation block;
   wherein the step of producing respective sub-block correlation results comprises, for each sub-block, the steps of:
      correlating the sub-block of the first symbol sequence with all possible sequences for the sub-block of the second symbol sequences to produce a plurality of possible correlation results for the sub-block; and
      for each of the second symbol sequences, selecting a respective one of the possible correlation results for the sub-block, to constitute the sub-block correlation result for the respective second symbol sequence, in dependence upon the sub-block of the respective second symbol sequence.

2. A method as claimed in claim 1 wherein the correlation block length is L symbols and each of the sub-blocks comprises k symbols, where L=mk and L, k, and m are integers.

3. A method as claimed in claim 2 wherein each of the second symbol sequences is a binary symbol sequence and the step of correlating each sub-block of the first symbol sequence with all possible sequences for the sub-block of the second symbol sequences produces $2^k$ possible correlation results for the sub-block.

4. A method as claimed in claim 3 wherein each of the second symbol sequences is provided from a pseudo random noise sequence.

5. A method as claimed in claim 4 wherein the first symbol sequence is derived from a received signal of a wireless communications system.

6. A method as claimed in claim 5 and further comprising the step of detecting a maximum of the correlation results for the correlation block thereby to identify one of said second symbol sequences providing the maximum correlation result.

7. A method as claimed in claim 3 and further comprising the step of detecting a maximum of the correlation results for the correlation block thereby to identify one of said second symbol sequences providing the maximum correlation result.

8. A method as claimed in claim 1 and further comprising the step of detecting a maximum of the correlation results for the correlation block thereby to identify one of said second symbol sequences providing the maximum correlation result.

9. A correlation arrangement comprising:
   $2^k$ correlators each for correlating k symbols of a first symbol sequence with a respective one of $2^k$ different sequences each of k binary symbols to produce a respective one of $2^k$ correlator outputs;
   N selectors each responsive to k symbols of a respective one of N binary symbol sequences to select a respective one of said $2^k$ correlator outputs; and
   N accumulators each for accumulating the selected correlator outputs of a respective one of the N selectors for a plurality of m successive selected correlator outputs to produce a respective one of N correlation results for a correlation block of mk symbols;

where k, N, and m are integers greater or equal to one.

10. A correlation arrangement as claimed in claim 9 and further comprising a detector responsive to the N correlation results to identify one of the N binary symbol sequences providing a maximum correlation result.

11. A correlation arrangement as claimed in claim 10 and further comprising a pseudo random noise sequence source for providing the N binary symbol sequences.

12. A correlation arrangement as claimed in claim 9 and further comprising a pseudo random noise sequence source for providing the N binary symbol sequences.

13. A wireless communications system receiver including a correlation arrangement as claimed in claim 9, wherein the first symbol sequence is derived from a received signal of the system.

14. A wireless communications system receiver including a correlation arrangement as claimed in claim 11, wherein the first symbol sequence is derived from a received signal of the system.

15. A correlation arrangement comprising:

means for correlating k symbols of a first symbol sequence with a respective one of $2^k$ different sequences each of k binary symbols to produce a respective one of $2^k$ correlator outputs;

means for selecting for each of N binary symbol sequences a respective one of said $2^k$ correlator outputs in dependence upon k symbols of the respective binary symbol sequence; and means for accumulating, for each of the N binary symbol sequences, a plurality of m selections of said correlator outputs to produce a respective one of N correlation results for a correlation block of mk symbols;

where k, N, and m are integers.

16. A correlation arrangement as claimed in claim 15 and further comprising means responsive to the N correlation results for identifying one of the N binary symbol sequences providing a maximum correlation result.

17. A correlation arrangement as claimed in claim 16 and further comprising means for providing the N binary symbol sequences from a pseudo random noise sequence.

18. A correlation arrangement as claimed in claim 15 and further comprising means for providing the N binary symbol sequences from a pseudo random noise sequence.

19. A wireless communications system receiver including a correlation arrangement as claimed in claim 15, wherein the first symbol sequence is derived from a received signal of the system.

20. A wireless communications system receiver including a correlation arrangement as claimed in claim 17, wherein the first symbol sequence is derived from a received signal of the system.

* * * * *

UNITED STATES PATENT AND TRADEMARK OFFICE
CERTIFICATE OF CORRECTION

PATENT NO. : 6,411,610 B1
DATED : June 25, 2002
INVENTOR(S) : Bin Li et al.

It is certified that error appears in the above-identified patent and that said Letters Patent is hereby corrected as shown below:

Column 8,
Line 7, should read: -- where k, N, and m are integers greater or equal to one."

Signed and Sealed this

Seventeenth Day of December, 2002

JAMES E. ROGAN
*Director of the United States Patent and Trademark Office*